C. H. Clark. Tube Expander.
No. 119,121.
Patented Sep. 19, 1871.
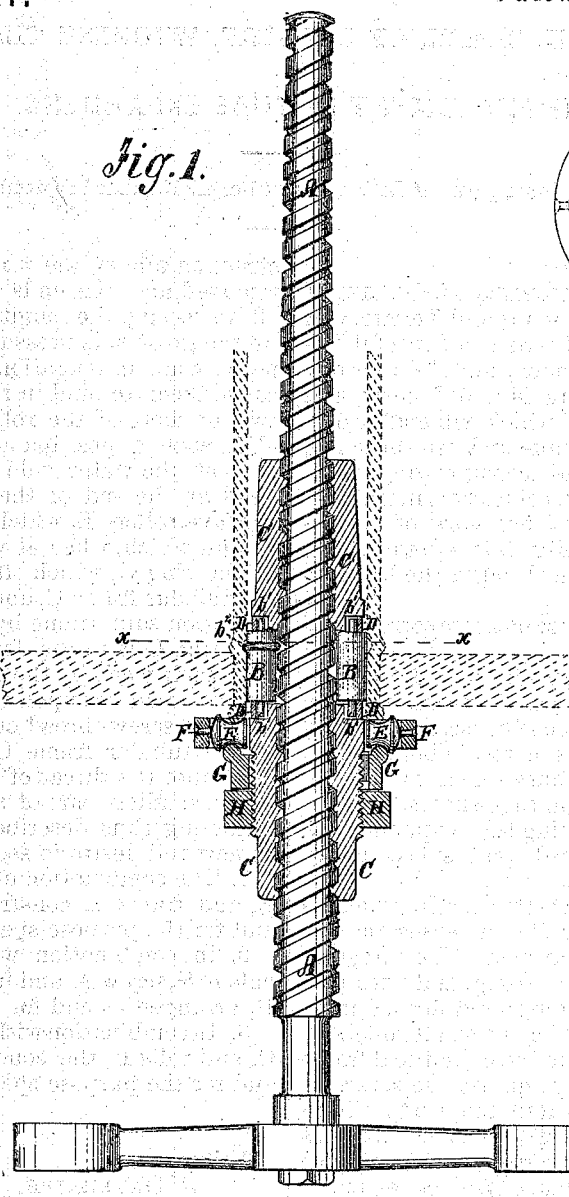
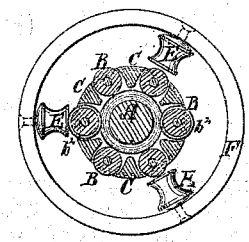
Witnesses:
A. Bennerndorf.
Wm. H. C. Smith.
Inventor:
C. H. Clark.
Per
Attorneys.

UNITED STATES PATENT OFFICE.

CHARLES H. CLARK, OF LARAMIE, WYOMING TERRITORY.

IMPROVEMENT IN TUBE-EXPANDERS.

Specification forming part of Letters Patent No. 119,121, dated September 19, 1871.

*To all whom it may concern:*

Be it known that I, CHARLES H. CLARK, of Laramie, in the county of Albany and Territory of Wyoming, have invented a new and useful Improvement in Tube-Expander; and I do hereby declare that the following is a full, clear, and exact description thereof, which will enable others skilled in the art to make and use the same, reference being had to the accompanying drawing forming a part of this specification, in which—

Figure 1 is a detail sectional view of my improved tube-expander. Fig. 2 is a detail cross-section of the same taken through the line $x\,x$, Fig. 1.

Similar letters of reference indicate corresponding parts.

My invention has for its object to furnish an improved tool, simple in construction, effective in operation, and convenient for use, for expanding the ends of the tubes of steam-boilers, surface-condensers, &c., to cause them to fit accurately into the holes in the tube-sheets. My invention consists in improving tube-expanders, as hereinafter fully described and subsequently pointed out in the claims.

A is the central feed-screw or roll, which is made tapering, or gradually increases in size from its forward to its rear end. The thread of the screw A is made wide, strong, and with parallel sides, and has a shallow groove formed in its center to receive the bead of the small rollers B, which are placed in slots in the cylindrical frame C with their faces resting against the screw A. The rollers B are perforated longitudinally to receive a wire, $b^1$, the ends of which enter notches in the frame C, where they are secured in place by open spring-rings D, placed in grooves in the outer surface of the said frame C. This construction allows the wires $b^1$ to be conveniently removed and the ends of the rollers B ground off to receive the longitudinal extension caused by the great side pressure to which they are exposed when in operation, and which would soon cause them to bind in the frame C. Upon one, two, or more of the rollers B is formed a bead, $b^2$, in such a position as to form a bead in the tube at the water side of the tube-sheet. The bead at the end of the tube is formed by the concave rollers E, which are pivoted to the ring F, and which, when at work, rest upon the edge of the ring G, which fits upon the rear part of the tubular frame C, and is prevented from turning upon said frame by a tongue and groove. The ring G is forced forward to feed the rollers E to their work by the nut H, which fits upon a screw-thread cut upon the rear part of the frame C. The screw-thread cut upon the inner surface of the tubular frame C is made deep, so as to mesh into the thread of the screw or roll A even at the smallest part of said screw A.

Having thus described my invention, I claim as new and desire to secure by Letters Patent—

1. The combination of tapering screw A, rolls B, and frame C, constructed and operating as and for the purpose specified.

2. In combination with rolls B having journals $b^1\,b^1$, screw A, and frame C, the spring-bands D, arranged as and for the purpose specified.

3. In combination with tapering screw A, frame C, and rolls B, the concave rolls G, operated as and for the purpose specified.

C. H. CLARK.

Witnesses:
R. GALBRAITH,
WM. C. WILSON.